(No Model.)  4 Sheets—Sheet 1.
W. O. DOUGLAS.
BRIDGE.
No. 315,259. Patented Apr. 7, 1885.
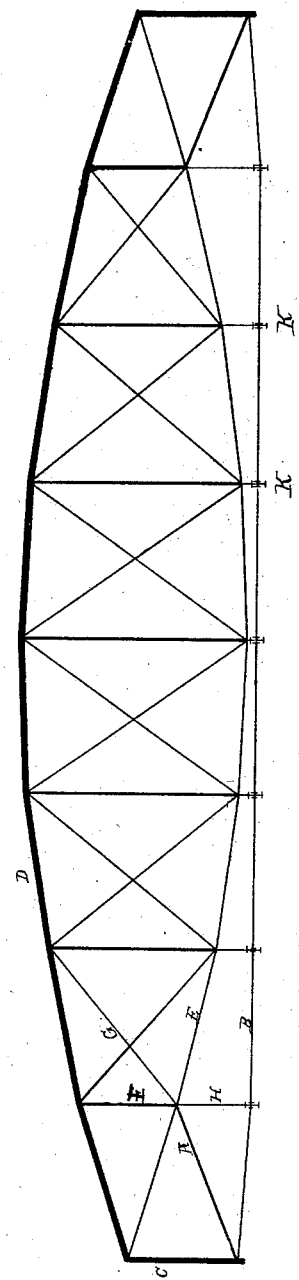
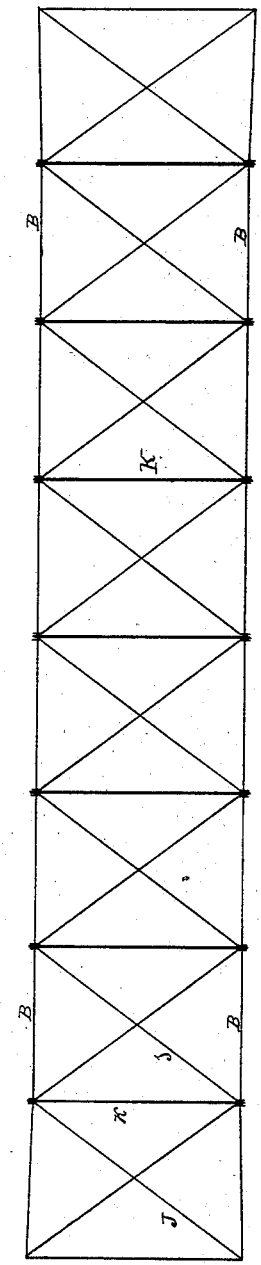
WITNESSES:
Edw. U. Byrn
Harrison R. Brown
INVENTOR:
Wm. O. Douglas
BY Munn & Co.
ATTORNEYS.

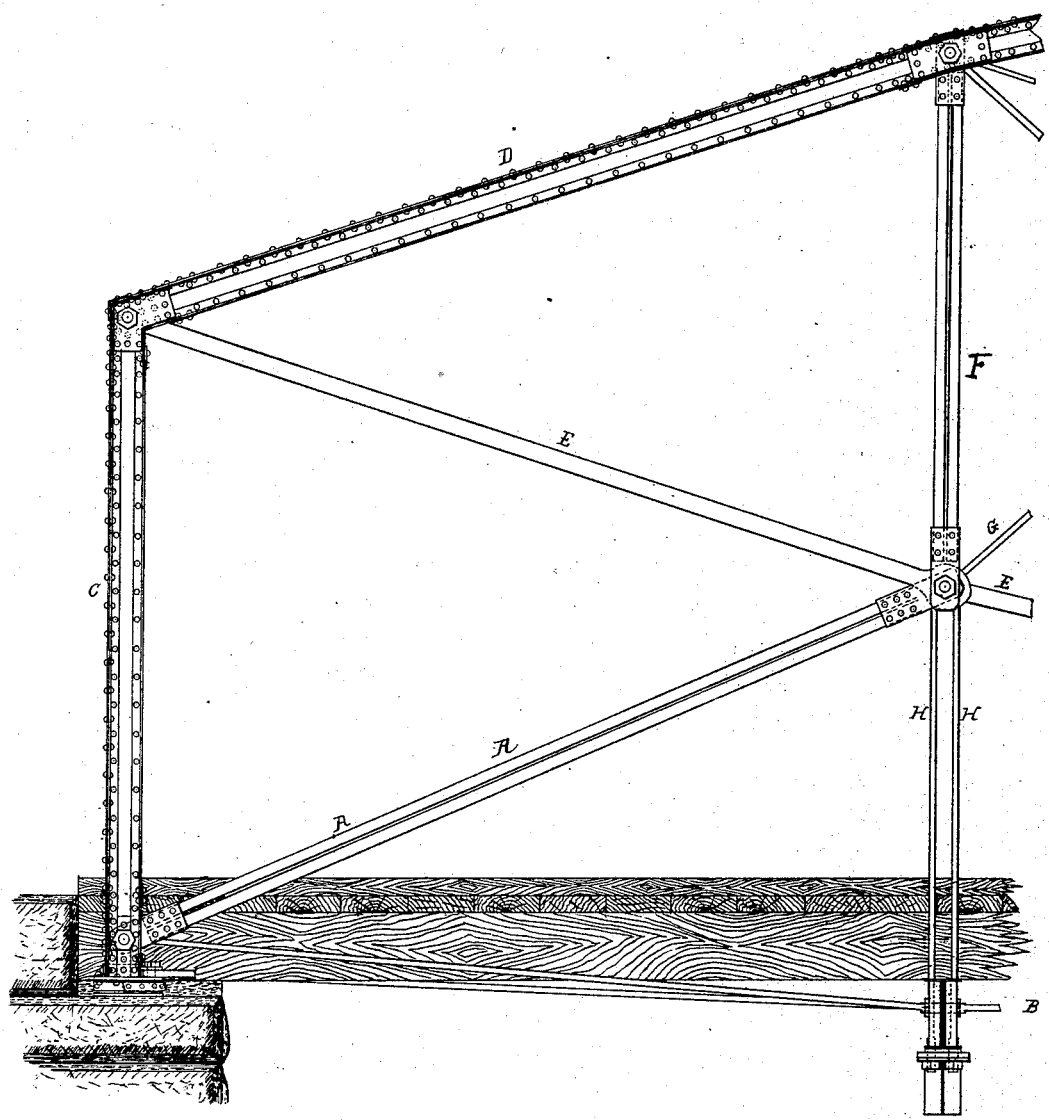
FIG. III (No Model.) W. O. DOUGLAS. 4 Sheets—Sheet 3.
BRIDGE.
No. 315,259. Patented Apr. 7, 1885.
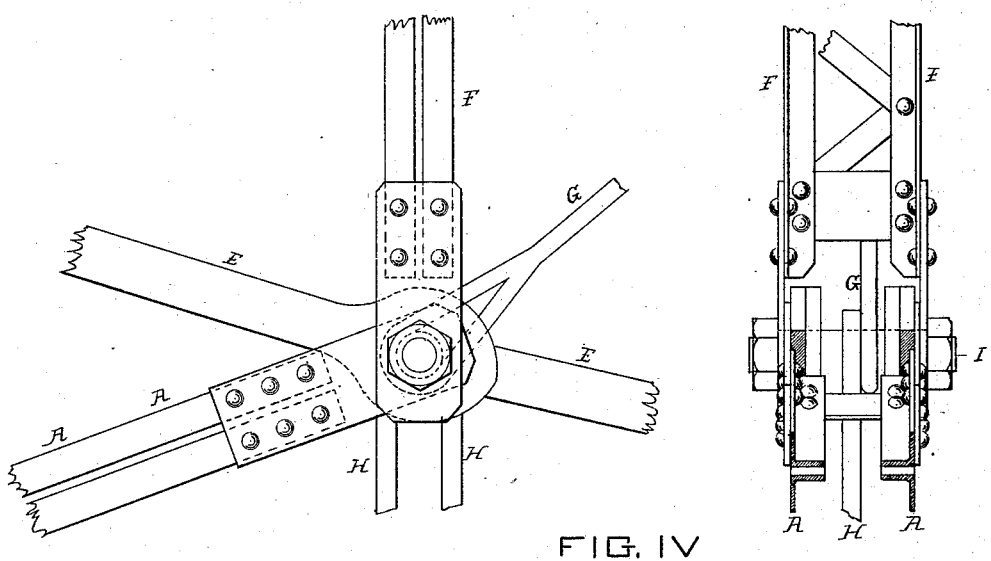
FIG. IV.
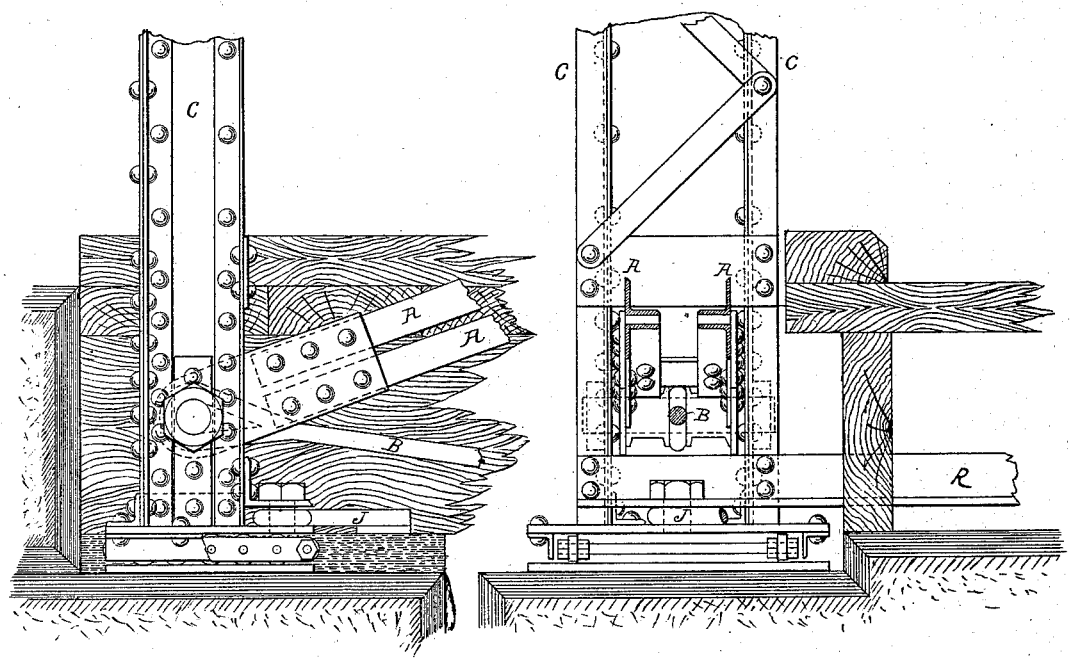
FIG. V.
WITNESSES:
INVENTOR:
Wm. O. Douglas
BY Munn & Co.
ATTORNEYS.

(No Model.)  4 Sheets—Sheet 4.
W. O. DOUGLAS.
BRIDGE.
No. 315,259.  Patented Apr. 7, 1885.
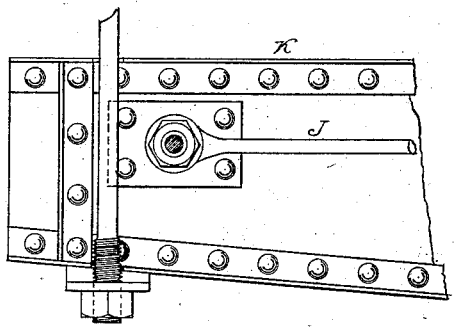
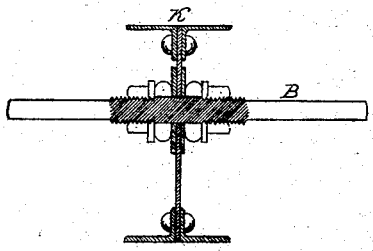
FIG VI
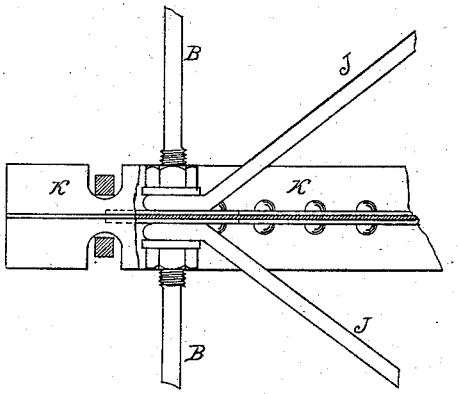
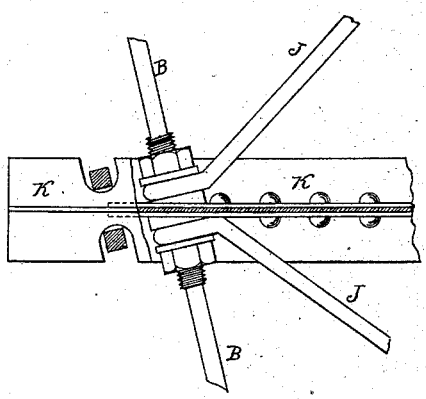
FIG VII  FIG VIII
WITNESSES:  INVENTOR:
Edw. W. Byrn.  Wm O. Douglas
Harrison D. Brown  BY Munn & Co
  ATTORNEYS.

UNITED STATES PATENT OFFICE.

WILLIAM O. DOUGLAS, OF BINGHAMTON, NEW YORK.

BRIDGE.

SPECIFICATION forming part of Letters Patent No. 315,259, dated April 7, 1885.

Application filed October 18, 1884. (No model.)

*To all whom it may concern:*

Be it known that I, WILLIAM O. DOUGLAS, a citizen of the United States, residing at Binghamton, in the county of Broome and State of New York, have invented certain new and useful Improvements in Bridges, of which the following is a description.

A very important factor in bridge construction is the means employed to resist the effect of the wind or other force acting laterally on a truss. This is especially true in long spans where the conditions are such that the distance between the trusses of a bridge is limited. In the case of a parabolic truss this wind-truss is a very important factor in the construction of a bridge, requiring in long spans with narrow roadway a large amount of material because the chords or flanges of the wind-truss have been heretofore designed to resist both compression and tension, the leeward chord being in tension and the windward chord being in compression alternating upon the chords in character or kind of strain according to the direction of the wind or other force applied laterally.

My invention is designed to improve this condition of things in parabolic truss-bridges to the end of cheapening the cost of the bridge both in the amount of material and cost of construction and increasing its efficiency by providing a means by which both flanges of the wind-truss shall be always in tension, which is done by providing the brace A to resist the pull of the chords B in a parabolic truss.

Figure I represents an outline diagram in elevation of a parabolic truss. Fig. II represents an outline diagram of a floor-plan of the same. Fig. III represents an enlarged view of the end panel and part of the second panel of the truss shown in Fig. I, in which D represents the top chord of the supporting-truss; E, the bottom chord; C, the end post; F, the first web-post; G, the first web-tie; H, the suspender; B, the tension floor-line chord, and A the end brace-strut, all hereinafter described, and in different figures represented by the same letters.

Referring to Fig. III, A is the diagonal strut, extending from the first panel-point of lower chord to a pin near base of end post, to which same pin the tension floor-line chord B attaches. The strut A might extend from base of end post to second panel of lower chord, to first or second panel of upper chord, or to any convenient point in the supporting-truss in such a manner as to make a stiff fixed member to resist the pull arising from the tension floor-line chord B; but it is preferred as represented. In short spans less than about seventy-five feet the brace or strut A may be omitted, the tension floor-line chord being secured at the end post by a bolt in the masonry.

Fig. IV represents a detail side and sectional elevation of the first panel-point of the lower chord, showing lower chord, E, first web-post F, web-tie G, suspender H, and the diagonal strut-brace A, all connected at panel-point by pin I.

Fig. V represents a detail side and sectional view of base of end post, C, resting on a nest of rollers and connected with the diagonal strut-brace A and the tension floor-line chord B by means of a pin passing through the three pieces R.

Fig. IV represents a brace between the end posts to keep them from drawing together under the tension of sway-rods J.

Figs. VI and VII represent the connection of tension floor-line chord B with floor-beam K and sway-rod J. In Fig. VIII the same connection is shown for a bridge askew with the abutments. In all of the above figures the connections are by means of pins; but I do not confine myself to the use of pins alone in the connections; but my invention would be the same if the connections were made by rivets or otherwise. The forms of the different parts as represented are those generally used in the parabolic truss; but these forms may be changed to suit the different conditions or different details of construction.

In a separate application of even date herewith I have shown, described, and claimed the tie-rod B in connection with the rods J and floor-beams K, forming a lower lateral wind-truss; and I therefore make no broad claim to that feature in this case.

What I claim as my invention is—

The combination of a tension floor-line chord, B, with a strut-brace, A, or its described equivalent in a parabolic truss-bridge, whereby a point in the end post is fixed so rigidly as to resist the pull of the chords B, making both flanges of the wind-truss always in tension, substantially as illustrated and described.

WILLIAM O. DOUGLAS.

Witnesses:
F. J. BAYLESS.
CHAS. D. MATTHEWS.